United States Patent
Sun et al.

(10) Patent No.: US 8,915,082 B2
(45) Date of Patent: Dec. 23, 2014

(54) REGENERATIVE ASSISTED TURBOCHARGER SYSTEM

(75) Inventors: Harold Huimin Sun, West Bloomfield, MI (US); David R. Hanna, Troy, MI (US); Michael Levin, Ann Arbor, MI (US); Eric Warren Curtis, Milan, MI (US); F. Zafar Shaikh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 696 days.

(21) Appl. No.: 13/020,769

(22) Filed: Feb. 3, 2011

(65) Prior Publication Data

US 2012/0198843 A1   Aug. 9, 2012

(51) Int. Cl.

| | |
|---|---|
| *F02B 33/44* | (2006.01) |
| *F01K 23/06* | (2006.01) |
| *F01K 27/00* | (2006.01) |
| *F02B 21/00* | (2006.01) |
| *F02D 23/00* | (2006.01) |
| *F02B 39/08* | (2006.01) |
| *F02D 41/00* | (2006.01) |
| *F02B 39/14* | (2006.01) |
| *F02D 41/04* | (2006.01) |

(52) U.S. Cl.
CPC .............. *F02D 23/00* (2013.01); *F01K 23/065* (2013.01); *Y02T 10/144* (2013.01); *F01K 27/005* (2013.01); *F02D 41/0007* (2013.01); *F02B 21/00* (2013.01); *F02B 39/14* (2013.01); *F02B 39/08* (2013.01); *F02D 41/045* (2013.01)
USPC ........................................... 60/608; 60/605.2

(58) Field of Classification Search
USPC .................... 60/605.2, 607, 608, 609, 413
See application file for complete search history.

(56) References Cited

U.S. PATENT DOCUMENTS

| | | | | |
|---|---|---|---|---|
| 4,285,200 A | | 8/1981 | Byrne et al. | |
| 4,622,817 A | * | 11/1986 | Kobayashi | 60/608 |
| 5,076,060 A | * | 12/1991 | Adeff | 60/608 |
| 5,113,658 A | * | 5/1992 | Kobayashi | 60/608 |
| 5,346,364 A | | 9/1994 | Kapich | |
| 5,421,310 A | | 6/1995 | Kapich | |
| 5,471,965 A | | 12/1995 | Kapich | |
| 5,924,286 A | * | 7/1999 | Kapich | 60/608 |

(Continued)

FOREIGN PATENT DOCUMENTS

| | | |
|---|---|---|
| EP | 1925794 A1 | 5/2008 |
| JP | 2007211621 | 8/2007 |

(Continued)

*Primary Examiner* — Thomas Denion
*Assistant Examiner* — Thomas Olszewski
(74) *Attorney, Agent, or Firm* — Julia Voutyras; Alleman Hall McCoy Russell & Tuttle LLP

(57) ABSTRACT

An engine is described having an engine control unit and two or more hydraulically operated wheels, wherein a fluid is flowed from an accumulator to the engine via the first wheel to assist in acceleration of the turbocharger in response to an acceleration signal from the engine control system and wherein the fluid is flowed from the engine to the accumulator via the second wheel to decelerate the turbocharger in response to a deceleration signal from the engine control unit. In one particular embodiment, the second wheel absorbs energy from the turbocharger in response to the deceleration signal from the engine control unit to decelerate the turbocharger. In some embodiments, the hydraulically operated wheels may be positioned on the same shaft of, and between, the turbine and compressor of the turbocharger.

17 Claims, 4 Drawing Sheets

(56) References Cited

U.S. PATENT DOCUMENTS

| | | | |
|---|---|---|---|
| 6,041,602 A * | 3/2000 | Dickey | 60/605.2 |
| 6,502,398 B2 * | 1/2003 | Kapich | 60/608 |
| 2006/0000207 A1 * | 1/2006 | Rush | 60/413 |
| 2006/0254274 A1 | 11/2006 | Kapich | |
| 2009/0173071 A1 * | 7/2009 | Kapich | 60/605.2 |
| 2011/0276204 A1 | 11/2011 | Shutty et al. | |
| 2012/0180480 A1 | 7/2012 | Kapich | |
| 2012/0180481 A1 | 7/2012 | Kapich | |
| 2012/0180482 A1 | 7/2012 | Kapich | |

FOREIGN PATENT DOCUMENTS

| | | | | |
|---|---|---|---|---|
| JP | 2007211621 A | 8/2007 | | |
| WO | WO2008057539 A2 | 5/2008 | | |
| WO | WO 2009026134 A2 * | 2/2009 | | F02B 33/44 |
| WO | WO2009026134 A2 | 2/2009 | | |

* cited by examiner

REGENERATIVE ASSISTED TURBOCHARGER SYSTEM

TECHNICAL FIELD

This disclosure relates generally to turbocharger systems and more particularly to regenerative assisted turbocharger systems.

BACKGROUND

As is known in the art, as turbocharged, downsized engines become a major strategy to improve vehicle fuel economy; improvement of their transient responses is very important. When a turbocharger is sized relatively small for rapid transient response, it may run out of flow capacity at high power thus limiting its rated power; on the other hand, when a turbocharger is sized large enough to deliver competitive power, it may perform very sluggishly during transients. There are several technologies that have been suggested to solve this dichotomy, e.g. use of a serial sequential turbocharger system, mechanical driven superchargers, or electrical driven superchargers or turbochargers.

As is also known, in conventional turbocharged engines, engine and turbocharger work independently with each other. The "lack of synchronization" pushes the compressor into a less efficient operating region during transient operation and drives the turbine to work with low speed ratios (U/C) (where U/C is the blade-speed ratio) thus operate in a lower efficiency operating region (i.e. the hydraulically governed turbocharger will allow the compressor and turbine to be designed for higher efficiency since they don't have to trade the efficiency for operation range).

SUMMARY

In accordance with the present disclosure, a turbocharged internal combustion engine is provided having a control unit and apparatus coupled to the turbocharger, to assist in acceleration of the turbocharger in response to an acceleration signal from the control unit and to decelerate the turbocharger in response a deceleration signal from the control unit.

In one embodiment, the apparatus absorbs energy from the turbocharger in response to the deceleration signal from the control unit to decelerate the turbocharger.

In one embodiment, the apparatus includes one or more hydraulic wheels on the same shaft of, and between, the turbine and compressor of the turbocharger, the one or more wheels being driven in response to the acceleration signal to assist in acceleration of the turbocharger or absorb energy from the turbocharger shaft in response to the deceleration signal.

In one embodiment the wheel or wheels are hydraulically operated wheels.

In one embodiment, the apparatus includes a hydraulically operated turbine to accelerate the turbocharger and a hydraulically operated pump to absorb energy to decelerate the turbocharger.

In one embodiment, the apparatus includes a reversible hydraulically operated turbine-pump.

In one embodiment, a system is provided having: an internal combustion engine; and a turbocharger, coupled to the engine. The turbocharger includes: a compressor; a turbine; a shaft connected between the compressor and the turbine; one or more hydraulically driven wheels disposed on the shaft; and a driver system for driving the one or more hydraulically driven wheels in response to an acceleration signal from a control unit to assist in acceleration of the turbocharger or having the one or more hydraulically driven wheels absorb energy in response to a deceleration signal from a control unit to assist in deceleration of the turbocharger.

In one embodiment, the system uses a pair of hydraulic wheels disposed on the shaft and a driver system and urges a first one of the wheels to produce a torque component in response to the control signal to accelerate the rotation of turbocharger or urges a second one of the wheels to produce a torque component in response to the deceleration control signal from the control signal.

In one embodiment, the system uses a pair of wheels is disposed on the shaft and the driver system urges a first one of the wheels to produce a torque component in a first angular direction in response to the control signal to accelerate the rotation of turbocharger and urges a second one of the wheels to produce a torque component in a second, opposite angular direction in response to the deceleration control signal from the control signal.

The absorbed energy may be converted to and stored either as electric or hydraulic/pneumatic format.

In one embodiment, the one, or more, wheels are driven by a fluid.

In one embodiment, the fluid is a liquid.

In one embodiment the fluid is engine oil used by the engine or other fluid.

In one embodiment, the fluid is supplied energy from a pneumatic energy source.

In one embodiment, the fluid is supplied energy from an electric energy source.

In one embodiment, the system includes a hydraulic electric generator activated during deceleration to generate electric energy for the electric energy source.

In one embodiment, the fluid is stored in a storage tank separate from the engine.

In one embodiment, a hydraulic turbo pump is disposed on the same compressor/turbine wheel or wheels to recover part of the exhaust energy thereby resulting in a more compact, durable arrangement compared with a system that uses an electric motor/electric energy storage system. The wheels are a hydraulic turbo-pump arrangement to also help govern turbo speed, i.e. to spin up during engine acceleration and slow down to recover exhaust energy during deceleration, throttling/motoring conditions.

In one embodiment, the hydraulic wheel may be driven either by engine oil or fuel or other liquid under high pressure when additional boost is needed to accelerate the turbocharger.

In one embodiment, a method is provided for operating a turbocharged internal combustion engine. The method includes assisting acceleration of the turbocharger in response to an acceleration signal from the control unit and decelerating the turbocharger in response a deceleration signal from the control unit.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
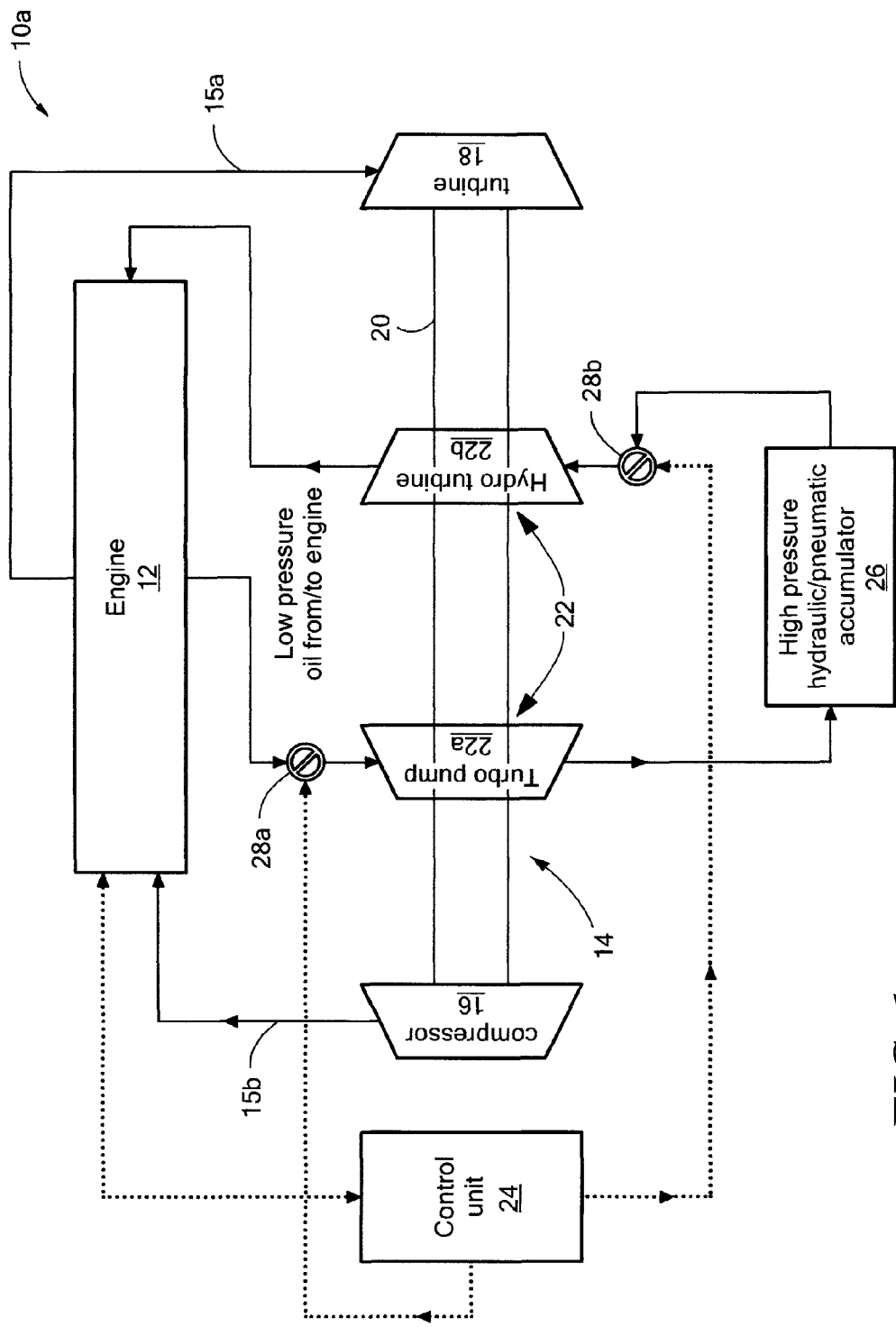
FIG. 1 is a turbocharged internal combustion engine system having apparatus to assist in acceleration or deceleration of the turbocharger selectively in accordance with a control signal according to one embodiment of the disclosure.

Referring now to FIG. 1, a system 10 is provided having: an internal combustion engine 12; and a turbocharger 14, coupled to the engine 12 in a conventional manner by airflow indicated by arrows 15a, 15b. The turbocharger 14 includes: a compressor 16; a turbine 18; a shaft 20 connected between the compressor 16 and the turbine 18 and one or more hydraulically driven wheels, here a pair of wheels 22a, which may be referred to as a second wheel, and 22b, which may be referred to as a first wheel, mounted to the shaft 20. An electronic control unit 24 (which may be separate from, or integrated with, an engine control unit for the engine 12) serves as a control system driving, here, for example, managing a fluid in the wheel 22b in response to an acceleration signal from the electronic control system, when an operator, not shown, demands torque from the engine 12, to assist in acceleration of the turbocharger (i.e., accelerating the angular rotational rate of the shaft 20) and driving, here, managing the loading on the wheel 22a in to response to a signal from the control unit 24 to assist in deceleration of the turbocharger (i.e., decelerating the angular rotational rate of the shaft 20). It is noted that electrical signals are carried by the lines shown dotted in FIG. 1, while lines carrying hydraulic fluid (to be described) are shown by solid lines.

As will be described in more detail below, the one or more hydraulically driven wheels provide an example of an apparatus 22 coupled to the turbocharger to assist in acceleration of the turbocharger 14 in response to the acceleration signal from the control unit 24 and to decelerate the turbocharger in response a deceleration signal from the control unit 24 with the apparatus 22 absorbing energy from the turbocharger in response to the deceleration signal from the control unit 24 to decelerate the turbocharger 14.

More particularly, wheels 22a, 22b may be, for example, Pelton wheels or impulse turbines having a plurality of vanes, not shown, disposed about its outer circumferential periphery. Wheel 22a is here a hydraulically operated pump while wheel 22b is a hydraulically operated turbine. Thus, a conventional turbocharger, with a hydraulic nozzle ring and a turbine wheel, has one, or more, wheels 22 mounted on the same shaft 20 of, and between, the gas turbine 18 and compressor wheels 16

A source of energy 26, here a chamber storing pressurized air or other gas in one section and a hydraulic fluid, here engine oil, provides a high pressure hydraulic/pneumatic accumulator. An electric motor or mechanical transmission can be used to power a hydraulic pump that keeps the hydraulic tank pressurized. As an alternative, a high speed hydraulic pump can be built within the turbocharger center housing on the same shaft between turbine and compressor wheel, such that during the engine braking mode or deceleration or even regular powering mode (e.g. during engine warm-up to buildup hydraulic pressure and accelerate after treatment warm-up due to extra accessory load), the hydraulic pump can be driven by excessive exhaust energy from turbine wheel to recover part of exhaust energy. Manipulating the hydraulic pump and turbine wheel provides a means to "synchronize" the turbocharger with engine operation conditions to ensure the compressor and turbine are working in a narrower but more efficient area, i.e. the hydraulically governed turbocharger will allow the compressor and turbine to be designed for higher efficiency since they don't have to trade the efficiency for operation range.

Also provided are electrically actuated valves 28a, 28b controlled by electrical signals supplied by the control unit 24.

In operation, in response to an acceleration signal from the control unit 24, valve 28a closes and valve 28b opens allowing hydraulic fluid, here engine oil, to pass under high pressure from the accumulator 26 to the vanes, not shown, of the hydro-turbine wheel 28b. The force on the blades from the impacting fluid increases the angular rotational rate of the shaft 20. The hydraulic fluid then passes from the hydro-turbine wheel 22b to the crankcase, not shown, of the engine 12. More particularly, as an example, consider that the shaft 20 is rotating in a clockwise direction (as a result of a dominant torque provided on the turbocharger by airflow passing through the turbocharger in a conventional manner) when view along a direction from the compressor 16 to the turbine 18. In response to the acceleration signal, the force on the blades from the impacting fluid produces a smaller, additional torque (i.e., torque component) in the clockwise direction thereby increasing the angular rotational rate of the shaft 20.

In response to a deceleration signal from the control unit 24, valve 28a opens and valve 28b closes allowing hydraulic fluid, here engine oil, to pass under low pressure from the crankcase of the engine 12 to the vanes, not shown, of the turbo-pump wheel 22a, with the rotating wheel 22a effectively pressurizing the engine oil. The flow of the fluid on the blades of wheel 22a decreases the angular rotational rate of the shaft 20. More particularly, as an example, consider that the shaft 20, is rotating in a clockwise direction (as a result of a dominant torque provided on the turbocharger by airflow passing through the turbocharger in a conventional manner) when view along a direction from the compressor 16 to the turbine 18. In response to the deceleration signal, the torque on the wheel 22a from the incoming fluid produces a small torque (i.e., small torque component) in the counter-clockwise direction thereby decreasing the angular rotational rate of the shaft 20 while increasing the fluid pressure at the exit of the turbo pump. The hydraulic fluid, pressurized by the wheel 22a, then passes from the turbo-pump wheel 22a to the accumulator 26.

Figure 2:
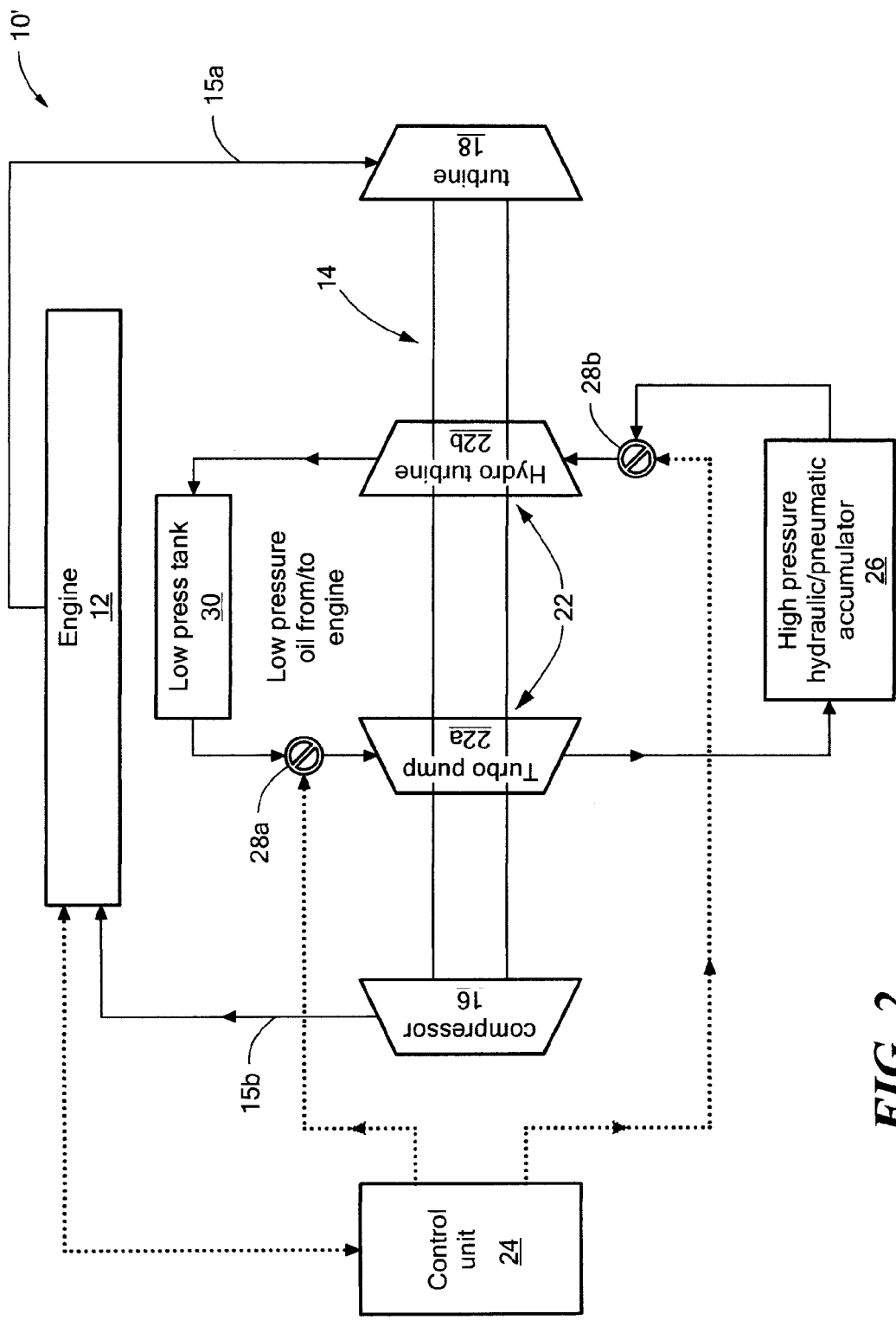
FIG. 2 is a turbocharged internal combustion engine system according to another embodiment of the disclosure.

Referring now to FIG. 2, another embodiment is shown. Here, instead of using engine oil as the hydraulic fluid for the wheels 22a, 22b, a low pressure storage tank 20 is provided for storing a suitable hydraulic fluid other than engine oil; for example power steering or other low viscosity fluid.

Figure 3:
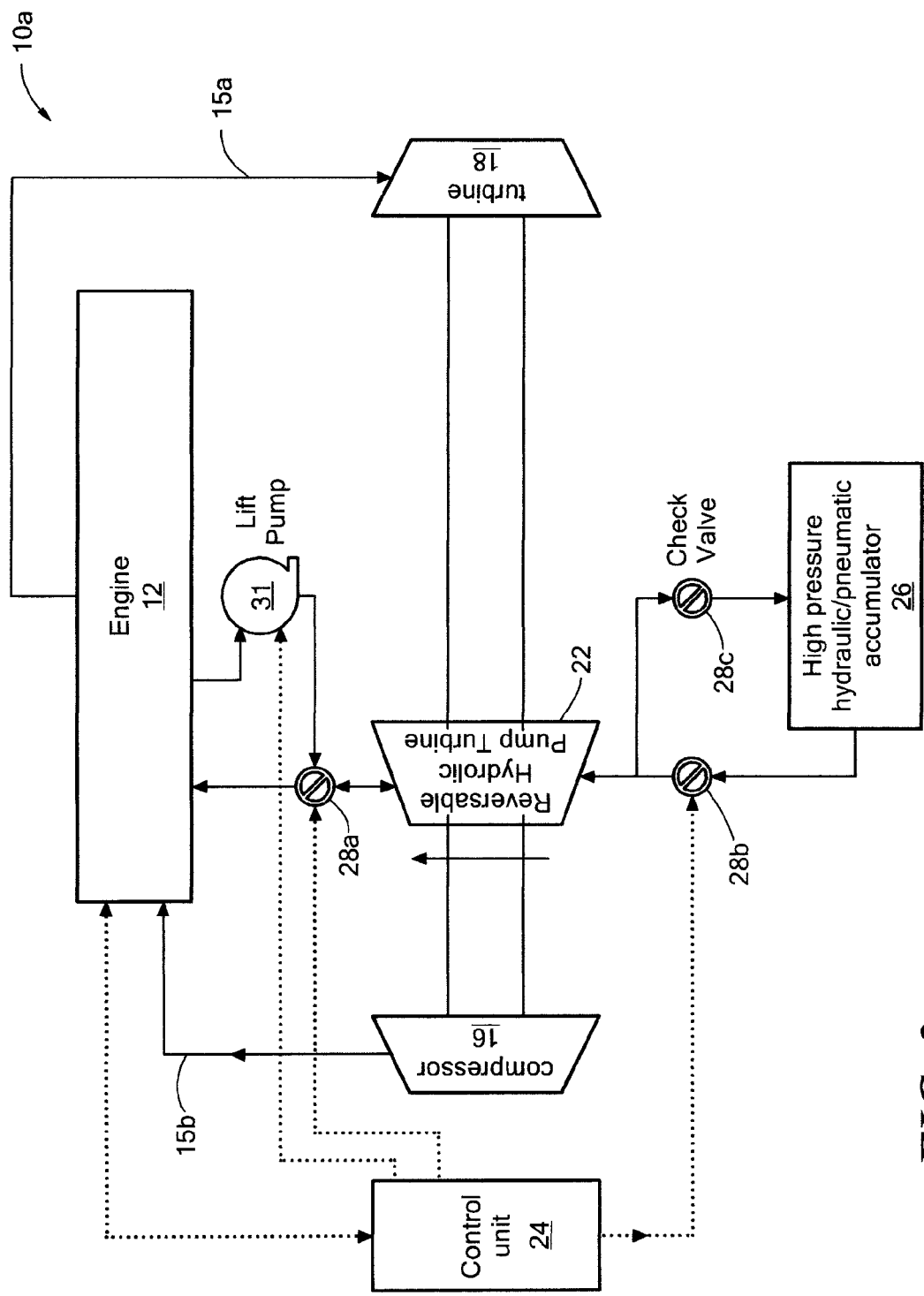
FIG. 3 is a turbocharged internal combustion engine system according to another embodiment of the disclosure.

Referring now to FIG. 3, another embodiment is shown. Here, a single wheel 22 is used. Here, wheel 22 is a reversible hydraulically operated turbine 22 again with vanes circumferentially about its outer periphery. In response to an acceleration signal from the control unit 24, both 28a and 28b both are open and a check valve 28c is closed to allow fluid to flow from high pressure accumulator 26 through reversible hydraulically operated turbine 22 to the engine 12 and thereby provide assisted torque to accelerate the turbocharger 14.

In response to a deceleration signal, the valve 28a remains open while valve 28b closes and check valve 28c opens so the fluid flows from engine 12, through reversible hydraulically operated turbine to flow through the check valve 28c into high pressure accumulator 26. Here, in the embodiment, a lift pump 31 is activated to assist in the flow of the fluid. In this pumping mode, valve 28*a* opens (28*b* closes), the lift pump 31 pressurize the fluid (to approximately, for example about 2-4 bar) from engine 12 to fill the pump turbine 22; the pump turbine 22 turbo shaft, not shown, being driven by the turbine 18. Once the pressure is above about 60-100 bar, the pressure pushes open the check valve 28*c* and the fluid flows into accumulator 26. Thus, the fluid flows through reversible hydraulically operated turbine in one direction during acceleration and through the reversible hydraulically operated turbine 22 in the reverse direction during declaration. During a steady state condition (i.e., when the engine 12 is not responding to either an acceleration signal or a deceleration signal), the control unit 24 supplies a signal to valve 28*a* to close valve 28*a*.

While in the embodiment shown in FIG. 3 engine oil is used as the hydraulic fluid, another fluid may be used with a separate low pressure hydraulic fluid storage tank as described above in connection with FIG. 2. Further, the storage tank may include a lift pump.

Figure 4:
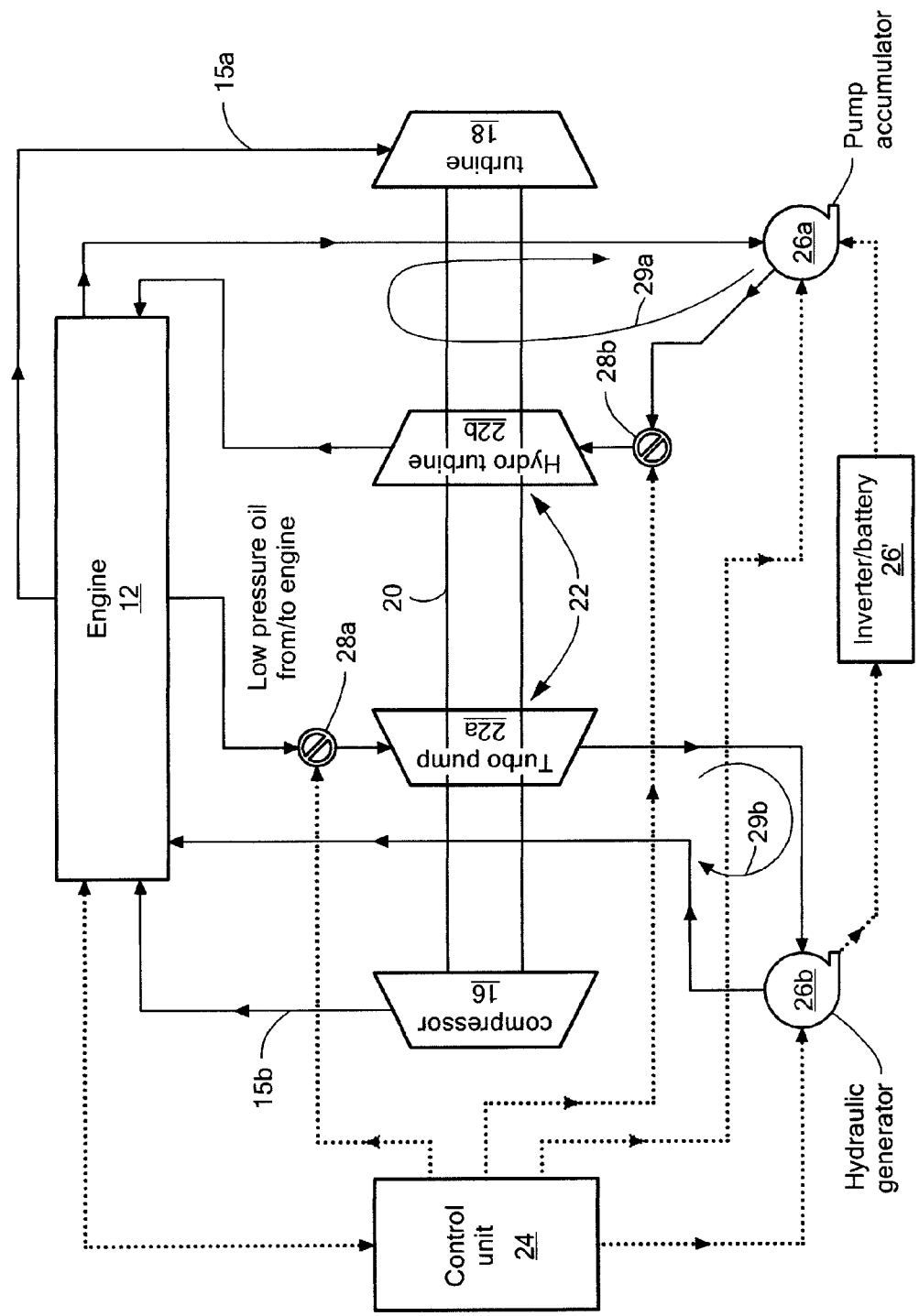
FIG. 4 is a turbocharged internal combustion engine system according to another embodiment of the disclosure.

Referring now to FIG. 4, another embodiment is shown. Here the source of energy includes an inverter/battery 26' a hydraulically powered electric generator 26*b* for supply energy to charge the inverter/battery 26; and a hydraulic fluid pump 26*a* powered by the inverter/battery 26'. During acceleration, valve 28*b* closes and valve 28*a* opens. Pump 26*a* pumps hydraulic fluid, here engine oil, in a closed loop 29*a* from the pump 26*a*, to the engine 12 crankcase, through the hydro turbine 22*b*, and back to pump 26*a*. The direction of the flow of the fluid on the blades of wheel 22*b* increases the angular rotational rate of the shaft 20.

During deceleration, valve 28*b* opens and valve 28*a* closes. Now, engine oil flows from the crankcase of the engine to the turbo pump wheel drawing the engine fluid from the engine crankcase. The fluid leaving the turbo pump 22*a* passes to the hydro motor generators 26*b* in closed loop 29*b* which generates electricity and recharges the battery 26'. The direction of the flow of the fluid on the blades of wheel 22*a* decreases the angular rotational rate of the shaft 20. It should be understood that a separate low-pressure hydraulic fluid storage tank may be used instead of using the engine oil as described above in connection with FIG. 2. Further, the storage tank may include a lift pump.

The hydraulic pumps described above may be either driven by an electric motor (stand-alone or shared with engine starter motor), or mechanically driven by the engine through a coupling with or without transmission. The hydraulic pump can be activated once the engine is started to buildup high pressure in the hydraulic tank and also increase the accessory load on the engine to accelerate engine and after-treatment warm-up.

The hydraulic pump can be alternatively installed within the turbocharger center housing that is mounted on the same shaft of the gas turbine and compressor and driven by the excessive exhaust gas energy from the gas turbine. In this case the turbo mounted hydraulic pump will be an additional wheel in the turbocharger shaft 20.

The turbo mounted hydraulic pump can be used to recover part of the exhaust excess energy which will be in turn used to drive hydraulic turbine during engine acceleration to reduce engine pumping loss thus improve vehicle fuel economy. The activation of hydraulic pump and hydraulic turbine can be controlled by fluid control thus avoid mechanical coupling. The hydraulic energy storage may further include liquid and gas. The fluid out of hydraulic pump in such case may be used to pressurize the gas to improve effectiveness of energy storage.

In is noted that while in conventional turbocharged engines, engine and turbocharger work independently with each other. The "lack of synchronization" causes compressor to work in less efficient during transient operation and pushes turbine working in low speed ratio (U/C) thus low efficiency area. Manipulating the hydraulic pump and turbine wheel provides a means to "synchronize" with engine operation conditions to ensure the compressor and turbine working in a narrower but more efficient area. A hydraulically governed turbocharger may control the airflow independently from engine operation condition thus eliminate the need for intake throttle for turbocharged gasoline and diesel engines. Any excessive hydraulic energy (e.g. during throttling mode, motoring or braking mode) can be coupled with engine energy output as turbocompound via hydraulic, electric motor or mechanic transmission to further improve fuel economy.

A number of embodiments of the disclosure have been described. For example, instead of using fluid driven wheels, one may use electric motors to drive the wheels to produce the acceleration and deceleration torque components. Nevertheless, it will be understood that various modifications may be made without departing from the spirit and scope of the disclosure. Accordingly, other embodiments are within the scope of the following claims.

What is claimed is:

1. An engine comprising:
   a control unit; and
   first and second hydraulically operated wheels coupled to a turbocharger, hydraulic fluid flowing from an accumulator to the engine via the first wheel to assist in acceleration of the turbocharger in response to an acceleration signal from the control unit and hydraulic fluid pumped from the engine to the accumulator via the second wheel to decelerate the turbocharger in response to a deceleration signal from the control unit.

2. The engine recited in claim 1 wherein the second wheel absorbs energy from the turbocharger in response to the deceleration signal from the control unit to decelerate the turbocharger.

3. The engine recited in claim 2 wherein the turbocharger includes a turbine and compressor connected by a shaft, and wherein the wheels include two or more wheels on the same shaft of, and between, the turbine and compressor of the turbocharger, the two or more wheels being driven in response to the acceleration signal to assist in acceleration of the turbocharger or absorb energy from the turbocharger shaft in response to the deceleration signal.

4. The engine recited in claim 1 wherein the turbocharger includes a turbine and compressor connected by a shaft, and wherein the first and second wheels are included on the same shaft of, and between, the turbine and compressor of the turbocharger, the wheels being driven in response to the acceleration signal to assist in acceleration of the turbocharger or absorb energy from the turbocharger shaft in response to the deceleration signal.

5. The turbocharged engine recited in claim 1, wherein the accumulator is located upstream from the first hydraulically operated wheel and downstream from the second hydraulically operated wheel with respect to a fluid flow direction.

6. A system comprising:
   an internal combustion engine;
   a turbocharger, coupled to the engine, comprising:
   a compressor;
   a turbine;
   a shaft connected between the compressor and the turbine;
   a plurality of wheels disposed on the shaft;

a control unit for producing an acceleration signal or a deceleration signal; and a driver system including the shaft driving the one or more wheels response responsive to the acceleration signal to operate the plurality of wheels to accelerate rotation of the turbocharger by flowing a fluid from an accumulator to the engine, and in response to the deceleration signal to operate the wheel or wheels to decelerate rotation of the turbocharger by pumping fluid from the engine to the accumulator.

7. The system recited in claim 6 wherein the plurality of wheels is a pair of wheels that are disposed on the shaft and wherein the driver system urges a first one of the wheels to produce a torque component in a first angular direction in response to the acceleration signal to accelerate the rotation of the turbocharger, and manages hydraulic loading on a second one of the wheels to produce a torque component in a second, opposite angular direction in response to the deceleration signal from the control unit.

8. The system recited in claim 6 wherein the plurality of wheels are driven by the fluid.

9. The system recited in claim 8 wherein the fluid is a liquid.

10. The system recited in claim 9 wherein the fluid is engine oil used by the engine.

11. The system recited in claim 8 wherein the fluid is actuated by energy supplied from a pneumatic energy source.

12. The system recited in claim 8 wherein the fluid is actuated by energy supplied from an electric energy source.

13. The system recited in claim 12 including a hydraulic electric generator activated during deceleration to generate electric energy for the electric energy source.

14. The system recited in claim 8 wherein the fluid is stored in a storage tank separate from the engine.

15. A method for operating a turbocharged engine, comprising:

assisting acceleration of the turbocharger in response to an acceleration signal from a control unit and decelerating the turbocharger in response to a deceleration signal from the control unit via first and second hydraulically driven wheels, respectively, where engine oil is pumped from the engine to an accumulator via a second wheel and from the accumulator to the engine via a first wheel.

16. The method cited in claim 15 including providing the first and second wheels on a shaft of the turbocharger between a turbine and compressor of the turbocharger, and driving the first wheel in response to the acceleration signal to assist in acceleration of the turbocharger, and absorbing energy from the turbocharger shaft in response to the deceleration signal.

17. A method for operating a turbocharged engine, comprising:

operating a control unit to produce an acceleration signal and a deceleration signal to assist in acceleration of a turbocharger by flowing a fluid from an accumulator to the engine in response to the acceleration signal from the control unit and to decelerate the turbocharger by pumping the fluid from the engine to the accumulator in response to the deceleration signal from the control unit.

* * * * *